US 7,401,145 B2

(12) United States Patent
Kang et al.

(10) Patent No.: US 7,401,145 B2
(45) Date of Patent: Jul. 15, 2008

(54) IN-LINE MODE NETWORK INTRUSION DETECT AND PREVENT SYSTEM AND METHOD THEREOF

(75) Inventors: Koo-Hong Kang, Daejeon (KR); Ik-Kyun Kim, Daejeon (KR); Byoung-Koo Kim, Daejeon (KR); Jong-Kook Lee, Daejeon (KR); Ki-Young Kim, Daejeon (KR); Jong-Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 947 days.

(21) Appl. No.: 10/773,793

(22) Filed: Feb. 5, 2004

(65) Prior Publication Data
US 2005/0076227 A1  Apr. 7, 2005

(30) Foreign Application Priority Data
Oct. 2, 2003  (KR) .................. 10-2003-0068718

(51) Int. Cl.
*G06F 15/173* (2006.01)
*G06F 12/00* (2006.01)
(52) U.S. Cl. ..................... 709/225; 709/250
(58) Field of Classification Search ........... 709/225, 709/229, 250; 726/23; 713/188
See application file for complete search history.

(56) References Cited
U.S. PATENT DOCUMENTS

| 6,898,632 B2* | 5/2005 | Gordy et al. ........... 709/224 |
| 2003/0101353 A1* | 5/2003 | Tarquini et al. ......... 713/200 |
| 2003/0159060 A1* | 8/2003 | Gales et al. ............. 713/200 |
| 2004/0093520 A1* | 5/2004 | Lee et al. ................ 713/201 |
| 2004/0199790 A1* | 10/2004 | Lingafelt et al. ........ 713/201 |
| 2005/0076228 A1* | 4/2005 | Davis et al. ............. 713/188 |

FOREIGN PATENT DOCUMENTS

| KR | 1020020062070 | 7/2002 |
| KR | 1020020072618 | 9/2002 |
| KR | 1020020088956 | 11/2002 |

OTHER PUBLICATIONS

"Stateful Intrusion Detection for High-Speed Networks", F. Valeur, et al., 2002 IEEE Symposium on Security and Privacy, 9 pages.
"A Networks IDS with Low False Positive Rate", Y. Qiao, et al., 2002 IEEE, pp. 1121-1126.

* cited by examiner

*Primary Examiner*—Zarni Maung
(74) *Attorney, Agent, or Firm*—Blakely, Sokoloff, Taylor & Zafman LLP

(57) ABSTRACT

Disclosed is an in-line mode network intrusion detecting and preventing system coupled between a protection network and an external network, for detecting intrusion states between the networks and preventing the intrusion. The system comprises a first network processor unit for monitoring the packets communicated between the networks to collect various statistical data, and performing a packet filtering process according to a packet preventing rule and a packet sensing process according to a sensing rule; and a second network processor unit for checking payloads of the packets with reference to attack signatures to detect the attack states to one of the networks.

12 Claims, 10 Drawing Sheets

IN-LINE MODE NETWORK INTRUSION DETECT AND PREVENT SYSTEM AND METHOD THEREOF

CROSS REFERENCE TO RELATED APPLICATION

This application is based on Korea Patent Application No. 2003-68718 filed on Oct. 2, 2003 in the Korean Intellectual Property Office, the content of which is incorporated herein by reference.

BACKGROUND OF THE INVENTION (a) Field of the Invention

The present invention relates to a system and method for detecting and preventing network intrusion. More specifically, the present invention relates to an in-line mode system and method for detecting network intrusion and hacking and preventing the same.

(b) Description of the Related Art

Recently, as computers and Internet usage have become popularized, network intrusion and hacking patterns have also quickly progressed, and these kinds of hacking that have benumbed the networks have generated serious economical loss such as suspension of electronic commerce services, as well as social disorders caused by suspension of Internet services.

An IDS (intrusion detection system) is accordingly required that copes with steep increase of network bandwidths and attacks by hackers and that has a more advanced hardware and software configuration.

Conventional IDSs are classified as host IDS products and network IDS products.

The host IDS products use an auditing system or event logs to protect a terminal system such as a server and a personal computer, and network applications.

The network IDS products monitor network traffic to detect attacks and intrusion and prevent hackers' attacks. Nowadays, the network IDS products are developed by concentrating on one of following three categories: signature detection, anomaly detection, and denial of service detection.

The hackers attack the networks by using attacking methods that were successfully utilized in the past. These attacks are analyzed by producers of network security products, and detailed profiles or attack signatures are generated through the analysis.

The attack signature detecting technique checks attack fingerprints within the network traffic, and compares them with known signatures to thereby detect network attacks or intrusions. When the attack signatures are checked within the input traffic, a security system generates an alarm signal or a warning signal so that a network manager may recognize the attack signatures.

The frequently used firewalls check specific fields such as an IP address or a port address within a packet head so as to determine whether to prevent input packets or allow them to pass. Therefore, it is impossible to detect the signatures within the traffic.

In addition, products by Snort are network IDS products that use a lipcap to detect the signatures located at random positions within the packets.

However, the products by Snort are only realized as software, and hence it is impossible to keep up with the network bandwidths increased by the network rates which gradually become faster. That is, it is impossible for the products by Snort to catch up with gigabit Internet interface rates in consideration of technical developments of general-purpose processors or connections of subsystems such as memories.

Therefore, some network IDS products have attempted improvements of performance by using an ASIC (application specific integrated circuit) type hardwired accelerator for exclusive use in order to cover the further increased bandwidths.

These attempts solve the performance problem, but have a difficulty in fluently meeting protocol modifications or diverse variations of attack patterns. In other words, the ASIC development cycles have many difficulties in appropriately coping with the fast changes of network intrusion.

Accordingly, it is required to provide a system and method for detecting network intrusions that change quickly.

SUMMARY OF THE INVENTION

It is an advantage of the present invention to provide an in-line mode network intrusion detect and prevent system and method thereof for checking network intrusion states, and preventing the corresponding attacks in real-time by using a gigabit Ethernet port, to thereby quickly cope with the network attacks and stably process a huge volume of traffic.

It is another advantage of the present invention to provide an in-line mode network intrusion detect and prevent system and method thereof for updating in real-time various references needed for detecting attack states through a manager (a personal computer), wherein the references includes a rule for metering the traffic, a filtering rule, and a sensing rule.

In one aspect of the present invention, in a system coupled between a protection network and an external network, for detecting intrusion states between the protection and external networks and preventing the intrusion, an in-line mode network intrusion detecting and preventing system comprises: a first network processor unit for monitoring an externally received PDU (packet data unit), collecting various statistical data according to a metering rule, selectively discarding or passing the received PDU according to a packet preventing rule, and generating a duplicate of the PDU according to a sensing rule; a second network processor unit for applying at least one attack signature to a payload of the PDU received from the first network processor unit, and detecting intrusion states between the protection and external networks; and a personal computer for generating or updating a packet preventing rule for preventing the intrusion detected by the second network processor unit, and providing the packet preventing rule to the first network processor unit.

The system further comprises a line interface for transmitting at least one PDU received from an external Ethernet interface to the first network processor unit.

In another aspect of the present invention, in a method for detecting intrusion states between a protection network and an external network, and preventing the intrusion, an in-line mode network intrusion detecting and preventing method comprises: (a) generating a packet preventing rule which is a reference for discarding at least one externally received PDU (packet data unit) or passing the same; (b) selectively discarding or passing the received PDU according to the generated packet preventing rule; (c) applying at least one attack signature to a payload of the passed PDU, and detecting the intrusion state between the protection and external networks; and (d) generating or updating a rule for preventing the detected attack, and preventing the detected attack.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
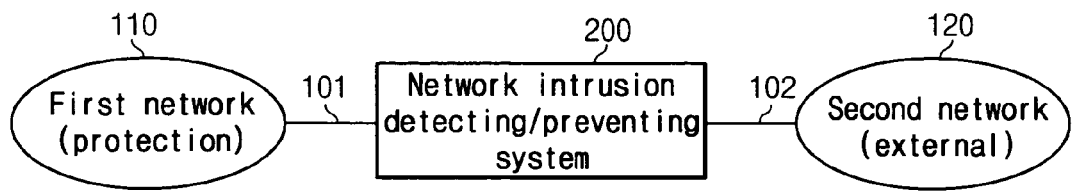
FIG. 1 shows a network configuration diagram to which an in-line mode network intrusion detect/prevent system according to a preferred embodiment of the present invention is applied.

FIG. 1 shows a network configuration diagram to which an in-line mode network intrusion detect/prevent system according to a preferred embodiment of the present invention is applied.

As shown, the in-line mode network intrusion detect/prevent system 200 is coupled to first and second networks 110 and 120 through gigabit Ethernet interfaces 101 and 102 to detect whether the packets that are passed between the first and second networks 110 and 120 are attacked, and to prevent the corresponding attacks. The first network 110 is a protection target network to be protected from the attacks, and the second network 120 is an external network.

Descriptions according to the preferred embodiment focus on detection of attacking the target network and the external network and prevention on the detected attacks, and without being restricted to this, the detection and the prevention on at least two target networks and two external networks can also be performed.

Figure 2:
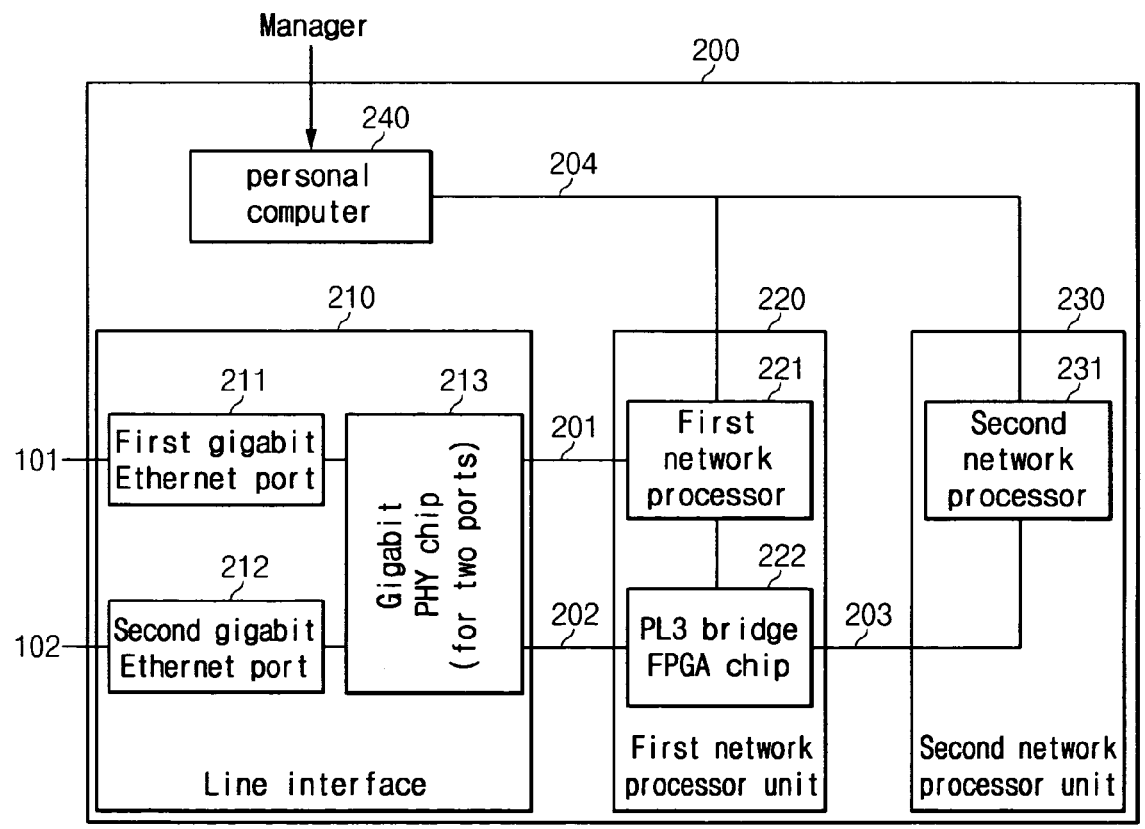
FIG. 2 shows a brief configuration of the in-line mode network intrusion detect/prevent system shown in FIG. 1.

FIG. 2 shows a brief configuration of the in-line mode network intrusion detect/prevent system 200 shown in FIG. 1.

As shown, the in-line mode network intrusion detect/prevent system 200 comprises a line interface 210, a first network processor unit 220, a second network processor unit 230, and a personal computer 240.

The line interface 210 comprises first and second gigabit Ethernet ports 211 and 212 and a gigabit PHY chip 213, the first network processor unit 220 comprises a first network processor 221 and a PL3 bridge FPGA (field programmable gate-array) 222, and the second network processor unit 230 comprises a second network processor 231. In this instance, APP500 which are 5G solutions provided by Agere are adopted to the first and second network processors 221 and 231, and without being restricted to them, different processors provided by other manufactures can also be applied.

The line interface 210 is coupled to the external gigabit Ethernet interfaces 101 and 102 through the first and second gigabit Ethernet ports 211 and 212.

The first network processor unit 220 collects statistical data corresponding to IETF RFC 2863 interface group MIB (management information base) used by a network management protocol of an Internet community, and various statistical data on all the packets received from the first or second network to thus perform a traffic metering process.

Concurrently, the first network processor unit 220 filters the packets according to a packet preventing rule that includes at least one of a transmitter IP address, a destination IP address, a transmitter port address, a destination port address, a protocol, and a TCP flag bit, or that includes combinations of at least two of them.

Concurrently, the first network processor unit 220 senses the packets according to a sensing rule that includes at least one of a transmitter IP address, a destination IP address, a transmitter port address, a destination port address, a protocol, and a TCP flag bit, or that includes combinations of at least two of them.

The second network processor unit 230 checks the payloads of the packets received from the first network processor unit 220 in real-time with reference to the attack signatures provided by Snort to detect an attack status of the protection target network 110 or the external network 120.

The personal computer 240 generates or updates a rule for preventing the detected attacks, provides the rule to the first network processor unit 220, newly generates or updates a sensing rule according to a request by an administrator, and provides the sensing rule to the first network processor unit 220. Here, the personal computer 240 drives various applications needed for managing the IDS (intrusion detection system).

As to a packet flow in the above-configured in-line mode network intrusion detect/prevent system 200, external Ethernet frames are received through the first and second gigabit Ethernet ports 211 and 212. The received Ethernet frames are provided to the first network processor (i.e. the APP500) 221 through the gigabit PHY chip 213 and a 32-bit POS-PHY (packet over SONET—physical layer protocol) level-3 interface 201.

The Ethernet frames switched by the first network processor 221 are output to the first and second gigabit Ethernet ports 211 and 212 sequentially through the PL3 bridge FPGA chip 222 and the 32-bit POS-PHY level-3 interface 201.

That is, the Ethernet frames received at the first gigabit Ethernet port 211 are passed through the first network processor unit 220 and provided to the second gigabit Ethernet port 212, and the Ethernet frames received at the second gigabit Ethernet port 212 are passed through the first network processor unit 220 and provided to the first gigabit Ethernet port 211. Hence, the first and second networks 110 and 120 are logically well coupled each other to thereby allow the intrusion detect/prevent system 200 to operate in the in-line mode.

Figure 3:
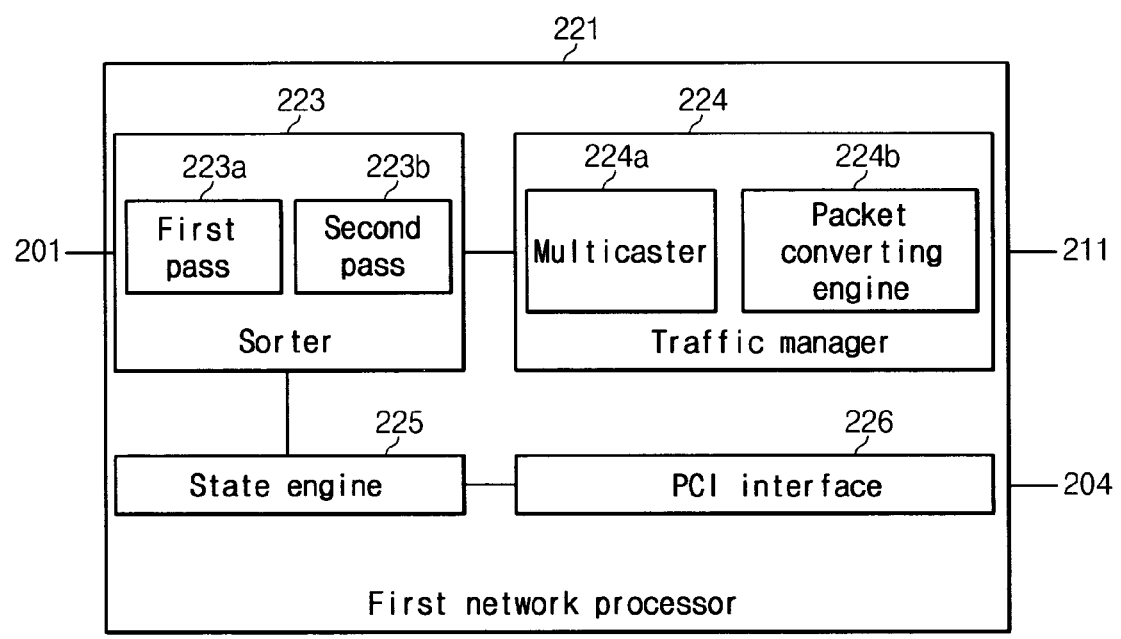
FIG. 3 shows a detailed configuration of a first network processor shown in FIG. 2.

FIG. 3 shows a detailed configuration of a first network processor shown in FIG. 2.

As shown, the first network processor 221 comprises a sorter 223, a traffic manager 224, a state engine 225, and a PCI interface 226. The divider 223 comprises first and second passes 223a and 223b, and the traffic manager 224 comprises a multicaster 224a and a packet converting engine 224b.

In detail, the sorter 223 sorts externally-received PDUs (packet data units) through pattern matching with input PDUs on the basis of a metering rule, a filtering rule, and a sensing rule received from the personal computer 240; the traffic manager 224 performs multicasting and packet conversion to the PDUs sorted by the sensing rule; the state engine 225 collects various statistical data related to all the packet data externally received; and the PCI interface 226 executes data communication with the personal computer 240 through a PCI bus 204.

Table 1 shows various statistical data collected by the state engine 225.

As given, the state engine 225 collects basic statistical data in real-time, and transmits them to the personal computer 240 through the PCI interface 226.

TABLE 1

| Class | Name | Description |
|---|---|---|
| Interface statistical data | InInOctets | Number of received octets |
| | InInUcastOkts | Number of received packets with target IP address of types A, B, and C |
| | IfInDiscards | Number of packets discarded by exhaustion of internal receiving buffer |
| | IfInErrors | Layer-3 head errors of received packets |
| | IfInUnknownProtos | Number of received packets of layer-3 protocol unsupported or unknown |
| | IfOutOctets | Number of transmitted octets |
| | IfOutUcastPkts | Number of transmitted packets with target IP address of types A, B, and C |
| | IfOutDiscards | Number of packets discarded by exhaustion of transmitting buffer |
| | IfOutErrors | Number of packets with transmission error |
| | IfInMulticastPkts | Number of received packets with target IP address of type D |
| | IfInBroadcastPkts | Number of received packets with target IP address as broadcast address |
| | IfConnectorPresent | Up/Down-Link |

The state engine 225 collects statistical data of specific traffic according to a traffic metering rule received from the personal computer 201, and the traffic metering rule includes at least one of a transmitter Ethernet address, a destination Ethernet address, an Ethernet type, a transmitter IP address, a destination IP address, a transmitter port address, a destination port address, a protocol, and a TCP flag bit, or includes combinations of at least two of them.

The sorter 220 processes the PDU input through the two passes. The first pass 223a processes the PDU by 64-byte blocks, and the second pass 223b processes data by a single PDU unit obtained by reassembling the 64-byte blocks.

The second pass 223b determines whether to transmit the packets received at the first network 110 (or the second network) through the pattern matching process to the second network 120 (or the first network) or to discard the packets according to a packet preventing rule received from the personal computer 240. According to the determination by the second pass 223b, the traffic manager 224 discards the received PDU or transmits it to the line interface 210 through the PL3 bridge FPGA chip 222. Concurrently, the second pass 223b determines according to the sensing rule received from the personal computer 240 whether to transmit the packets received through the pattern matching process to the second network processor unit 230. That is, the second pass 223b allows part of the received packets to be passed through the second network processor unit 230 so that the payload of the passed packets may be retrieved.

When the second pass 223b transmits the corresponding PDU and sensing states to the traffic manager 224, the multicaster 224a in the traffic manager 224 generates a duplicate of the PDU to be sensed, and the packet converting engine 224b adds 2-byte information to the duplicate of the PDU, and transmits the information-added duplicate of the PDU to the second network processor unit 230 through the PL3 bridge FPGA chip 222. In this instance, a reason for the multicaster 224a to generate another duplicate of the PDU is to transmit the original PDU to the other network (a destination network).

Next, the second network processor unit 230 detects network attacking states of the received duplicate of the PDU by using a rule provided by Snort, and Table 2 shows an exemplified Snort rule.

TABLE 2

```
#----------
# X11 RULES(Example 1)
#----------
alert tcp $EXTERNAL_NET any -> $HOME_NET 6000 (msg:"X11 MITcookie";
flags: A+ content: "MIT-MAGIC-COOKIE-1"; reference:arachnids,396;
classtype:bad-unknown; sid:1225; rev:1;)
#----------
# X11 RULES (example: RuleIDGroup)( Example 2)
#----------
alert tcp $EXTERNAL_NET any -> $HOME_NET 6000 (msg:"X11 xopen";
flags: A+; content: "|6c00 0b00 0000 0000 0000 0000|";
reference:arachnids,395; classtype:unknown; sid:1226; rev:1;)
#----------
# X11 RULES (example: RuleIDSimple)( Example 3)
#----------
```

TABLE 2-continued

```
alert tcp $EXTERNAL_NET 6000:6005 -> $HOME_NET any (msg:"X11
outgoing"; flags: SA; reference:arachnids,126; classtype:unknown; sid:1227;
rev:1;)
#----------------------------------------
# Subseven22 is a Trojan Horse (example: RuleIDNew)( Example 4)
#----------------------------------------
    alert tcp  $EXTERNAL_NET  27374  ->  $HOME_NET
any(msg:"BACKDOOR    subseven    22";    flow:to_server,established;
content:"|0d0a5b52504c5d3030320d0a|";       reference:arachnids,485;
reference:url,www.hackfix.org/subseven/;   classtype:misc-activity;   sid:103;
rev:5;)
```

As shown in Table 2, the Snort rule includes heads (indicated by underscores) and options (depicted by parentheses), and it is given in Example 1 that the protocol of the sensing rule used in the second pass 223b of the first network processor 221 is the TCP, the transmitter IP address and the transmitter port address have all values (random values), the destination IP address is its network address, the destination port address is 6,000, and the ACK flag of the TCP is 1.

The PDU transmitted to the second network processor unit 230 will now be described with reference to a drawing.

Figure 4:
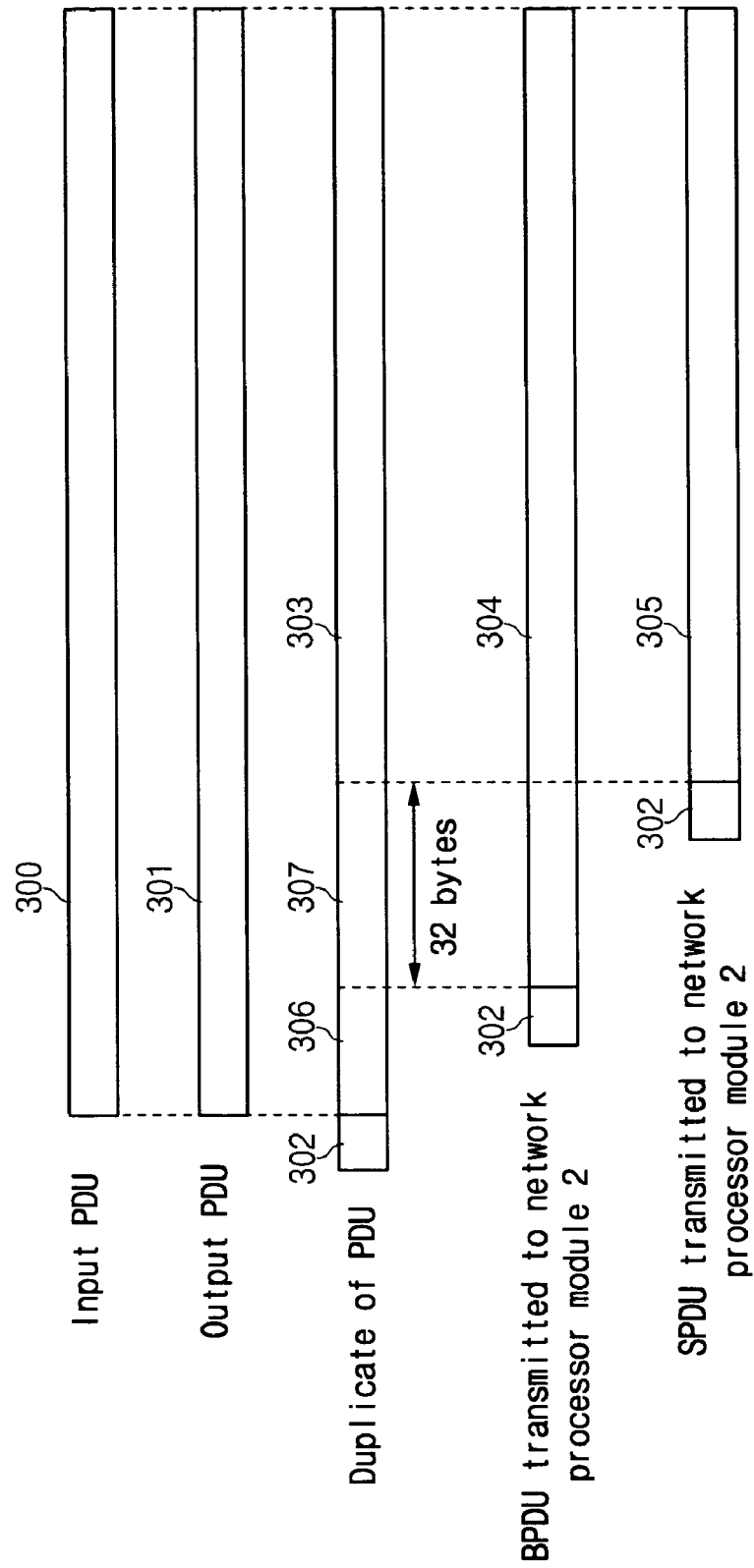
FIG. 4 shows a configuration of packet data transmitted to a second network processor unit according to a preferred embodiment of the present invention.

FIG. 4 shows a configuration of packet data transmitted to the second network processor 230 according to a preferred embodiment of the present invention.

A PDU 300 is input to the first network processor 221, an output PDU 301 is transmitted to the line interface 210, and a duplicate of the PDU 303 is transmitted to the second network processor unit 230 according to sensing states, and the output PDU and the duplicate of the PDU are transmitted to the PL3 bridge FPGA 222. A rule ID 302 added to the duplicate of the PDU 303 by the packet converting engine 224b is generated corresponding to the sensing rule at 1:1, and when necessary, a single rule may include a plurality of signatures.

Referring to a Snort rule of Table 2, rules of Examples 1 and 2 have the same sensing rule, which enables a single rule ID to have two different signatures. Table 3 shows rule IDs generated based on the Snort rule of FIG. 2.

TABLE 3

| Rule IDs | Attacks |
| --- | --- |
| 0x0001 | X11_MITcookie, X11_open |
| 0x0002 | X11_outgoing |
| 0x0003 | BACKDOOR_subseven22 |

Figure 5:
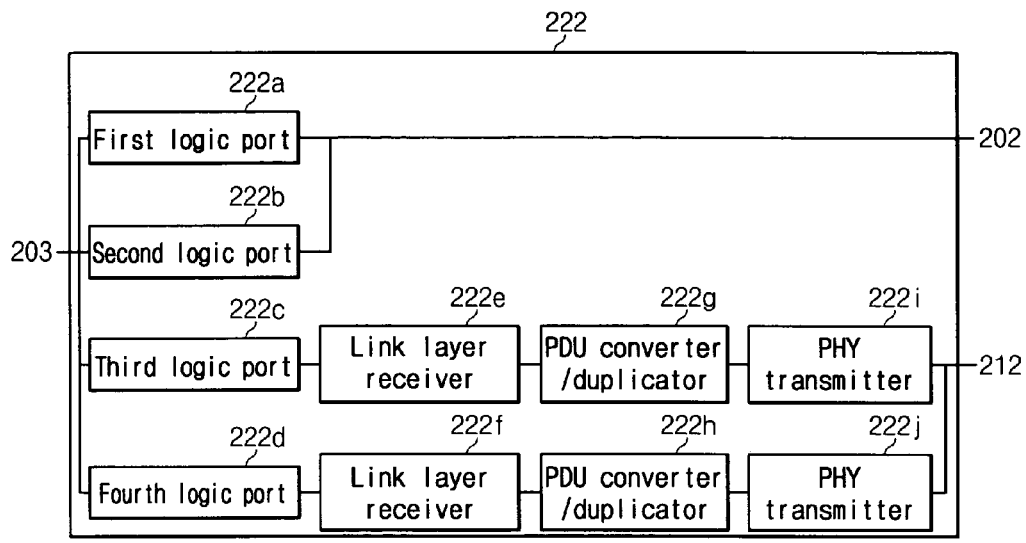
FIG. 5 shows a detailed configuration of a PL3 bridge FPGA chip shown in FIG. 2.

FIG. 5 shows a detailed configuration of the PL3 bridge FPGA chip 222 shown in FIG. 2.

As shown, the PL3 bridge FPGA chip 222 comprises first to fourth logic ports 222a to 222d, link layer receivers 222e and 222f, PDU converters/duplicators 222g and 222h, and PHY transmitters 222i and 222j.

The first logic port 222a (or the second logic port) transmits the output PDU 301 that is to be output to the gigabit Ethernet interface 101 or 102, to the gigabit PHY chip 213 through the POS-PHY level-3 interface 202. The third logic port 222c (or the fourth logic port) transmits the duplicate of the PDU 303 received from the gigabit Ethernet port 211 (or the second gigabit Ethernet port) to the link layer receivers 222e and 222f.

The link layer receivers 222e and 222f transmit the received duplicate of the PDU 303 to the PDU converters/duplicators 222g and 222h, and the PDU converters/duplicators 222g and 222h generate a BPDU (bearer PDU) and an SPDU (shortened PDU) based on the received duplicate of the PDU, and transmit the BPDU and the SPDU to the PHY transmitters 222i and 222j.

A reason for the PDU converters/duplicators 222g and 222h to generate the BPDU and the SPDU based on the duplicate of the PDU is to perform quick handling through real-time matching when the second network processor unit 230 performs pattern matching which will be executed later.

The PHY transmitters 222i and 222j transmit the BPDU and the SPDU to the second network processor unit 230 through the POS-PHY level-3 interface 203.

A process for the PDU converters/duplicators 222g and 222h to generate the BPDU and the SPDU will now be described referring to FIG. 4.

The PDU converters/duplicators 222g and 222h of the PL3 bridge FPGA chip 222 convert the received duplicate of the PDU 303 into a BPDU 304 from which a PDU area 306 (e.g., a head in the PDU) which is unnecessary for signature matching of the second network processor unit 230 is removed, and transmits the BPDU 304 to the second network processor unit 230 through the POS-PHY level-3 interface 203. The PDU converters/duplicators 222g and 222h generates a 32-byte (307) reduced SPDU 305 compared to the BPDU 304 generated by using a duplicate function, and transmits the 32-byte reduced SPDU 305 to the second network processor 230.

Figure 6:
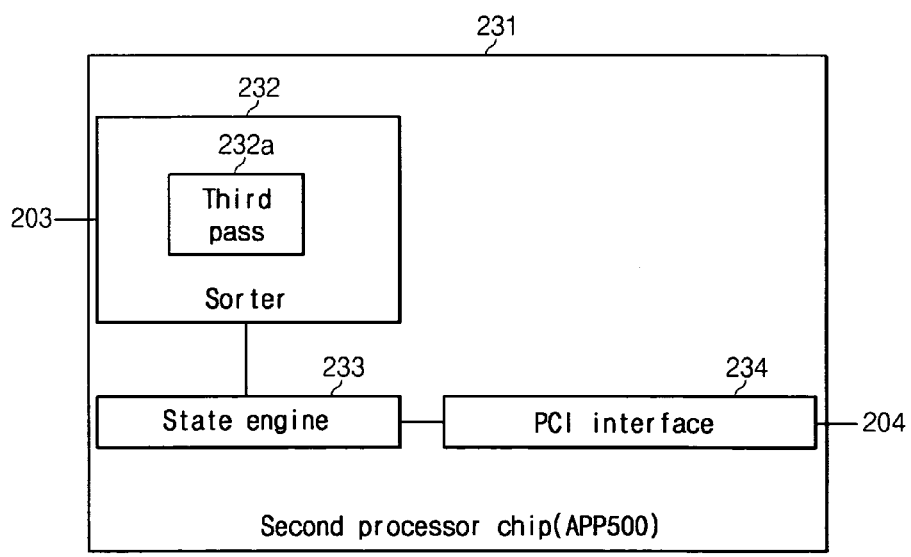
FIG. 6 shows a detailed configuration of a second network processor shown in FIG. 2.

FIG. 6 shows a detailed configuration of a second network processor shown in FIG. 2.

As shown, the second network processor 231 comprises a sorter 232, a state engine 233, and a PCI interface 234, and the sorter 232 includes a third pass 232a.

The sorter 232 detects network intrusion states and attacks through pattern matching based on the Snort rule, the state engine 233 collects and manages information on the detected intrusion and attacks, and the PCI interface 234 transmits the information on the detected intrusion and attacks to the personal computer 240 through a PCI bus 204.

In detail, the sorter 232 detects a network intrusion or an attack, transmits an alarm message to the personal computer 240, and the personal computer 240 transmits a new Snort rule to the third pass 232a and transmits a traffic preventing rule to the first network processor unit 220 so as to prevent the detected attack, thereby protecting the first or second network in real-time.

That is, the third pass 232a in the sorter 232 performs pattern matching on the payloads of the BPDU 304 and the SPDU 305 according to the Snort rule received from the personal computer 240 to check the attack states, that is, to check whether attack signatures are respectively provided to the BPDU 304 and the SPDU 305, which will now be described.

Figure 7:
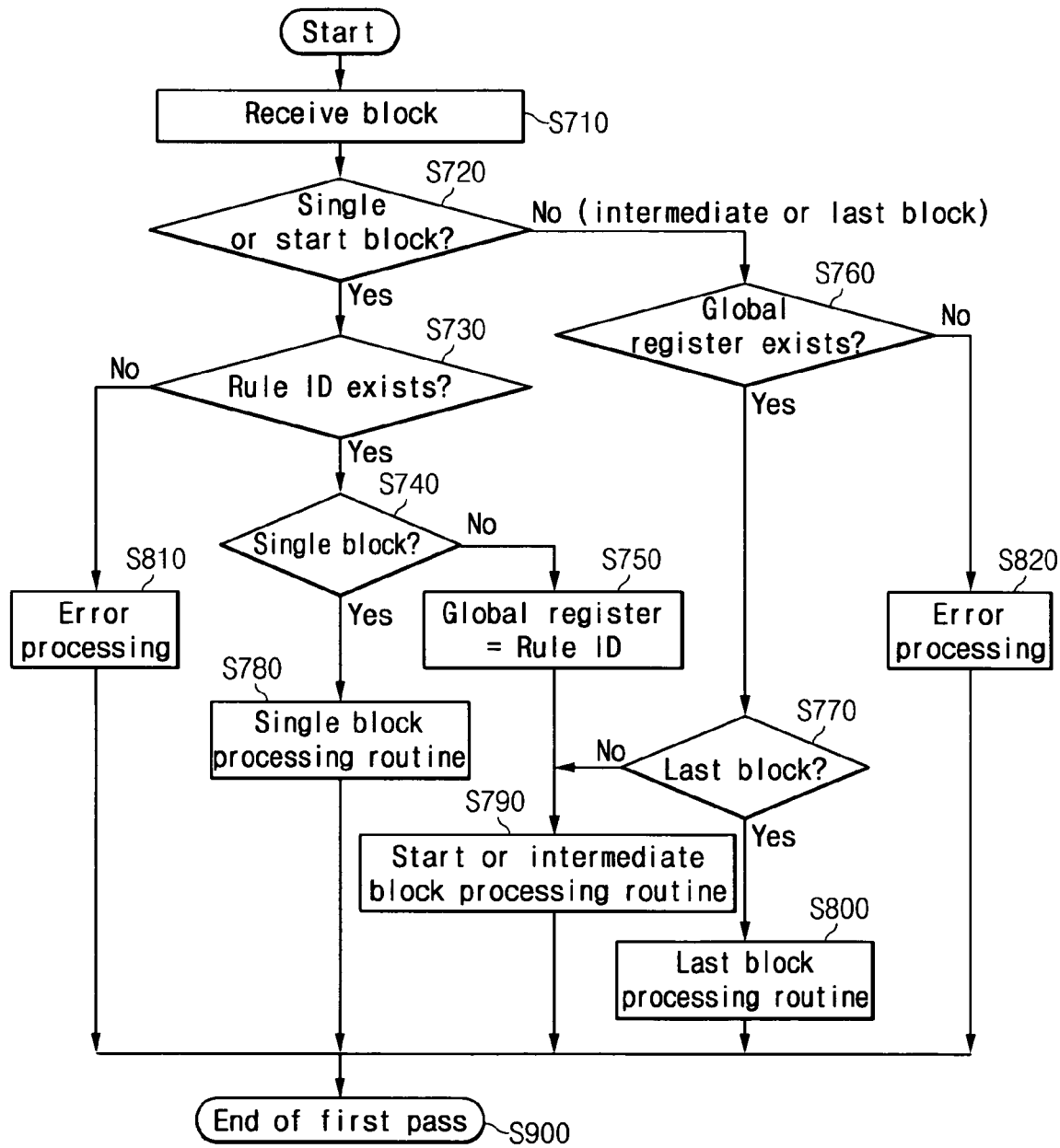
FIG. 7 shows a flowchart for an operation of the second network processor unit shown in FIG. 2.

FIG. 7 shows a flowchart for an operation of the second network processor unit shown in FIG. 2.

As shown, the third pass 232a divides the BPDU 304 and the SPDU received in step S710 from the first network processor unit 220 into 64-byte blocks. A reason for the third pass 232a to divide the BPDU 304 and the SPDU into 64-byte packet data is that the APP500 which is the second network processor 231 installing the third pass 232a processes the data by 64 bytes.

In detail, the third pass 232a configures the BPDU 304 and the SPDU 305 as a single block when their length is less than 64 bytes, configures them as a start block and a last block when their length is greater than 65 bytes and less than 128 bytes, and configures them as a start block, a plurality of intermediate blocks, and a last block when their total data size is greater than 129 bytes.

The third pass 232a checks whether the block received from the first network processor unit 220 is a single block or a start block in step S720, and checks whether the received block has a rule ID (about 2 bytes) in step S730 when the block is found as a single block or a start block. The third pass 232a checks whether the block is a single block in step S740 when the rule ID is provided, and the third pass 232a performs a corresponding process routine in step S780 when it is a single block.

When it is not a single block but a start block, the third pass 232a anticipates that the intermediate blocks or the last block of the corresponding PDU will continue to come, stores the rule ID of the start block in a global 5 register (not illustrated) in step S750, and performs a process routine of the start block or the intermediate blocks in step S790.

When the first block has no rule ID, the third pass 232a performs an error process in step S810. When the block is an intermediate block or a last block, the third pass 232a checks whether the rule ID of the corresponding block has a global register in step S760, and performs an error process in step S820 when it has no global register.

When the first block has a rule ID, the third pass 232a checks whether the corresponding block is the last block in step S770, and when it is the last block, the third pass 232a performs a last block processing routine in step S800, and when it is an intermediate block, the third pass 232a performs a start or intermediate block processing routine in step S780.

Processing routines of the respective blocks (single, start, intermediate, and last blocks) will now be described.

Figure 8:
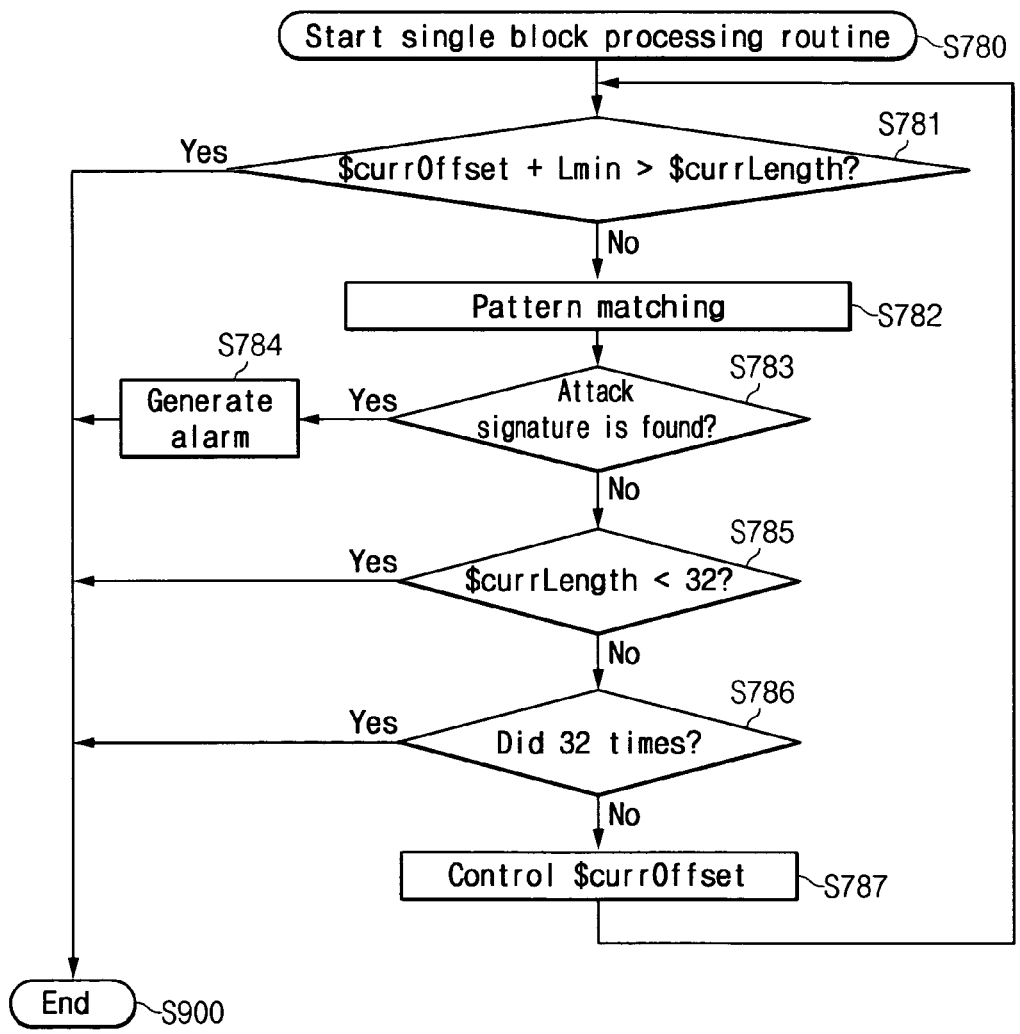
FIG. 8 shows a flowchart for a single block processing stage shown in FIG. 7.

FIG. 8 shows a flowchart for a single block processing stage shown in FIG. 7.

The third pass 232a checks a sentence of $currOffset+Lmin>63$ ($currLength$) so as to perform pattern matching on the single block in step S781, where $currOffset is a start pointer for checking a pattern of the current block, Lmin is a length of the signature having the shortest length from among the signatures which belong to the current rule ID, and $currLength is a total length of the current block.

The third pass 232a terminates the pattern matching process on the single block in step S900 when the checking result is 'yes,' and performs the pattern matching when the checking result is 'no' in step S782.

When an attack signature is found according to the pattern matching result in step S783, the third pass 232a generates an alarm to the personal computer 240 in step S784, and terminates the operation process in step S900.

When no attack signature is found, the third pass 232a checks whether it is satisfied that $currLength<32 in step S785.

In this instance, $currLength is the total length of the current block and has values of from 0 to 63 bytes. The number of data bytes to be checked through the pattern matching is limited to have the maximum 32 bytes, since the PDU input from the network is divided into the BPDU 304 and the SPDU 305, a corresponding signature of the first 32 bytes of the 64-byte block is retrieved from the BPDU, and a corresponding signature of the other 32 bytes of the 64-byte block is retrieved from the SPDU. Data bytes greater than 64 bytes are not necessary for the pattern matching, and they become obstacles against real-time error detection.

When the checking result fails to satisfy that $currLength<32, the third pass 232a checks whether the number of pattern matching on the single block is 32 up to now in step S786, and when it is satisfied that $currLength<32, the operation process is terminated.

The third pass 232a controls $currOffset in step S787 by using a pattern matching start pointer mover (referred to as an fRSkip( ) hereinafter) when it is satisfied that $currLength<32, or the number of pattern matching on the single block is not 32, and the third pass 232a checks whether it is satisfied that $currOffset+Lmin>63 in step S781.

A single block generation process that is one of the attack signature detecting processes will be conceptually described with reference to FIG. 9.

Figure 9:
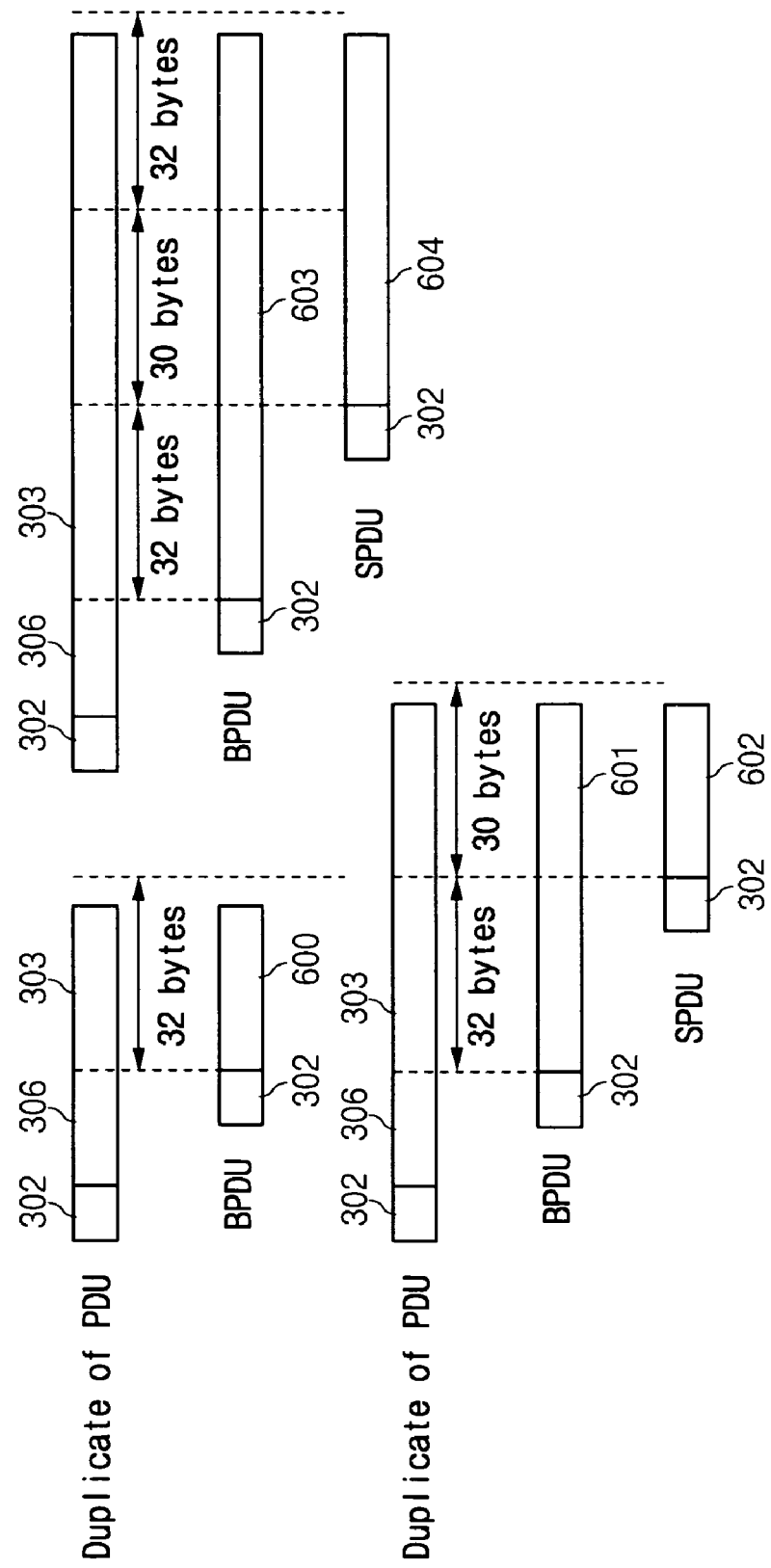
FIG. 9 shows a single block generation process according to a preferred embodiment of the present invention.

FIG. 9 shows a single block generation process according to a preferred embodiment of the present invention.

As shown, the third pass 232a generates a single BPDU 600 configured with a single block when the size of the duplicate of the PDU 303, except a rule ID 302 and a region 306 which will be excluded from the pattern matching (e.g., a head region), is less than 32 bytes.

The third pass 232a generates a BPDU 601 configured with a single block and a SPDU 602 configured in a single block when the size of the duplicate of the PDU 303, except the rule ID 302 and the region 306 which will be excluded from the pattern matching, is greater than 32 bytes or less than 62 bytes.

The third pass 232a generates a BPDU 603 configured with a start block 605 and a last block 606, and an SPDU 604 configured with a single block when the size of the duplicate of the PDU 303 except the rule ID 302 and the region 306 which will be excluded from the pattern matching is greater than 64 bytes or less than 94 bytes.

Figure 10:
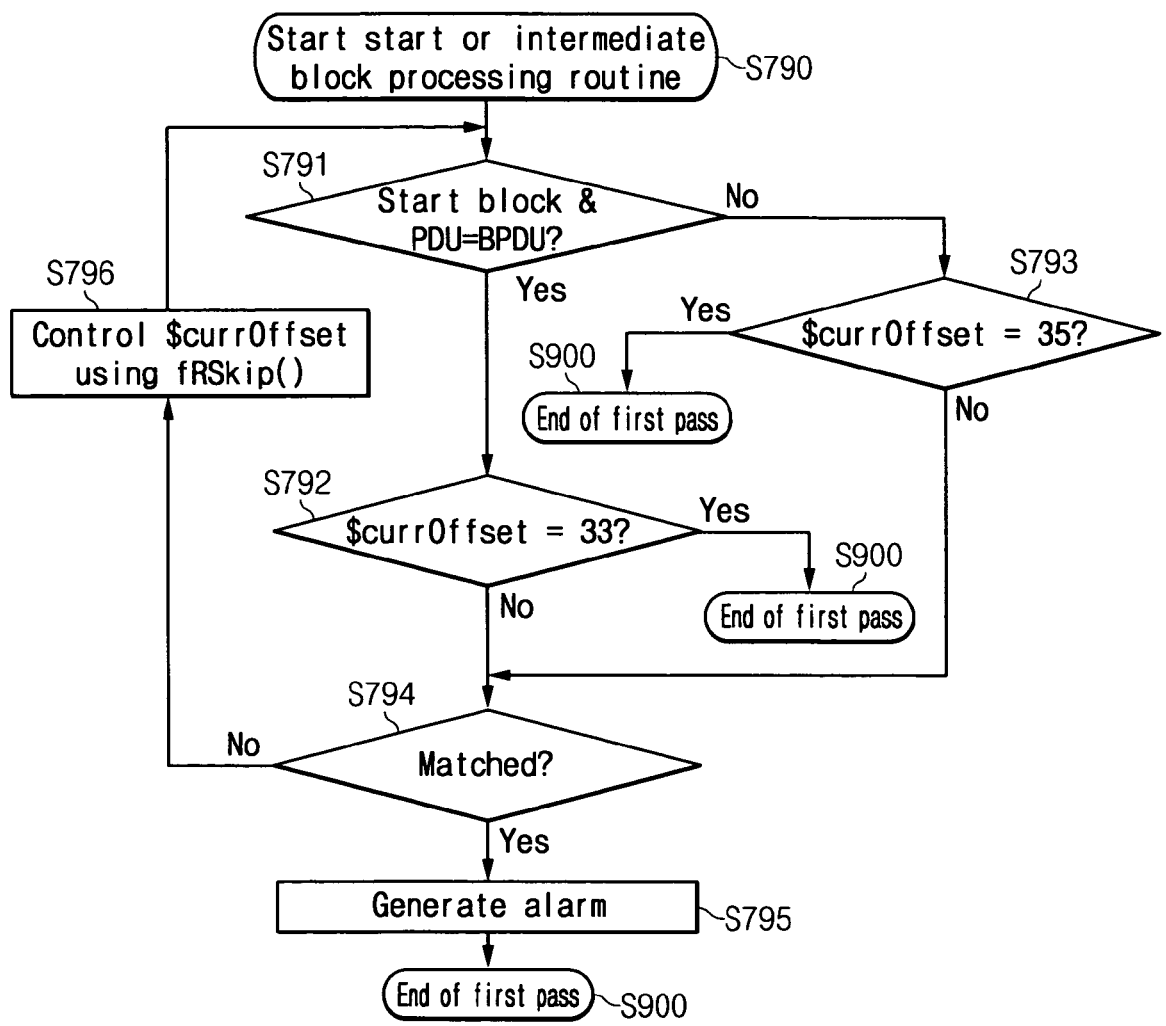
FIG. 10 shows a flowchart of a start block or intermediate block processing stage shown in FIG. 7.

FIG. 10 shows a flowchart of a start or intermediate block processing stage shown in FIG. 7.

As shown, the third pass 232a checks in step S791 whether the block received from the first network processor unit 230 satisfies that 'start block&PDU=SPDU?', and checks in step S792 whether it satisfies that $currOffset=33 when it is satisfied, that is, when the received block is a start block and an SPDU. The third pass 232a checks in step S793 whether it is satisfied that $currOffset=35? when the received block is not a start block or an SPDU.

Satisfaction of the two conditions S792 and S793 represents that the current block has no corresponding signature, and the attack detecting process is terminated in step S900, and when the two conditions are not satisfied, the third pass 232a performs pattern matching according to the Snort rule (an attack signature) received from the personal computer 240 in step S794.

The third pass 232a generates an alarm message to the personal computer 240 in step S795 when finding a pattern matched with the attack signature, and uses fRSkip( ) to control $currOffset in step S796 when finding no pattern matched with the attack signature, and again checks the 'start block&PDU=SPDU?'.

Figure 11:
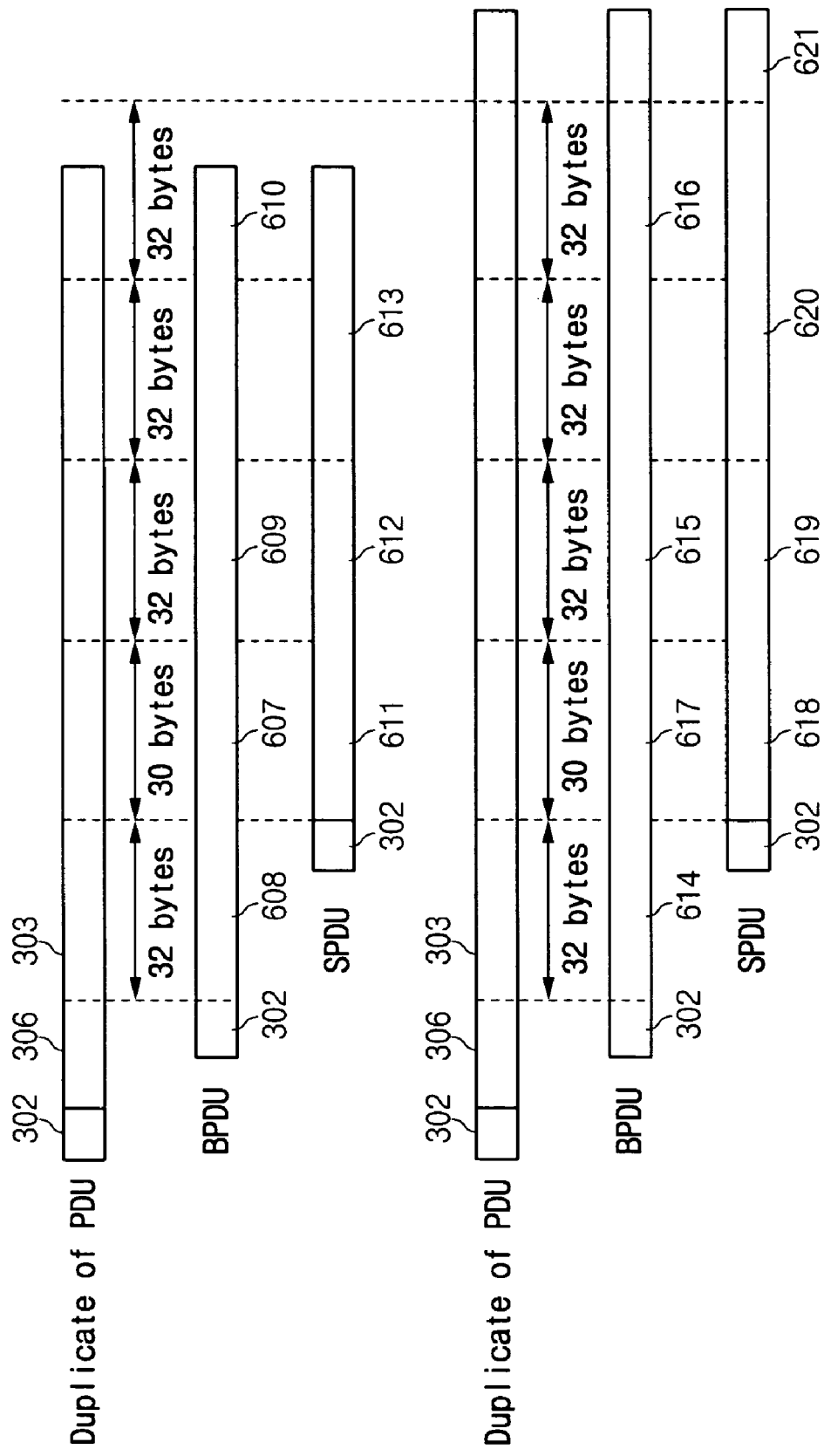
FIG. 11 shows a flowchart of a start block or intermediate block generation stage according to a preferred embodiment of the present invention.

FIG. 11 shows a flowchart of how a start block or intermediate block generation process according to a preferred embodiment of the present invention is applied.

As shown, when the data size of the duplicate of the PDU 303 except the rule ID 302 and the region 306 which will be excluded from the pattern matching is greater than 126 bytes or less than 158 bytes, the third pass 232a generates a BPDU 607 configured with a start block 608, an intermediate block 609, and a last block 610 of less than 32 bytes, and generates an SPDU 611 configured with a start block 612 and a last block 613 of less than 32 bytes.

When the data size of the duplicate of the PDU 303 except the rule ID 302 and the region 306 which will be excluded from the pattern matching is greater than 158 bytes or less than 190 bytes, the third pass 232a generates a BPDU 617 configured with a start block 614, an intermediate block 615, and a last block 616 of greater than 32 bytes, and generates an SPDU 618 configured with a start block 619, an intermediate block 620, and a last block 621 of less than 32 bytes.

Figure 12:
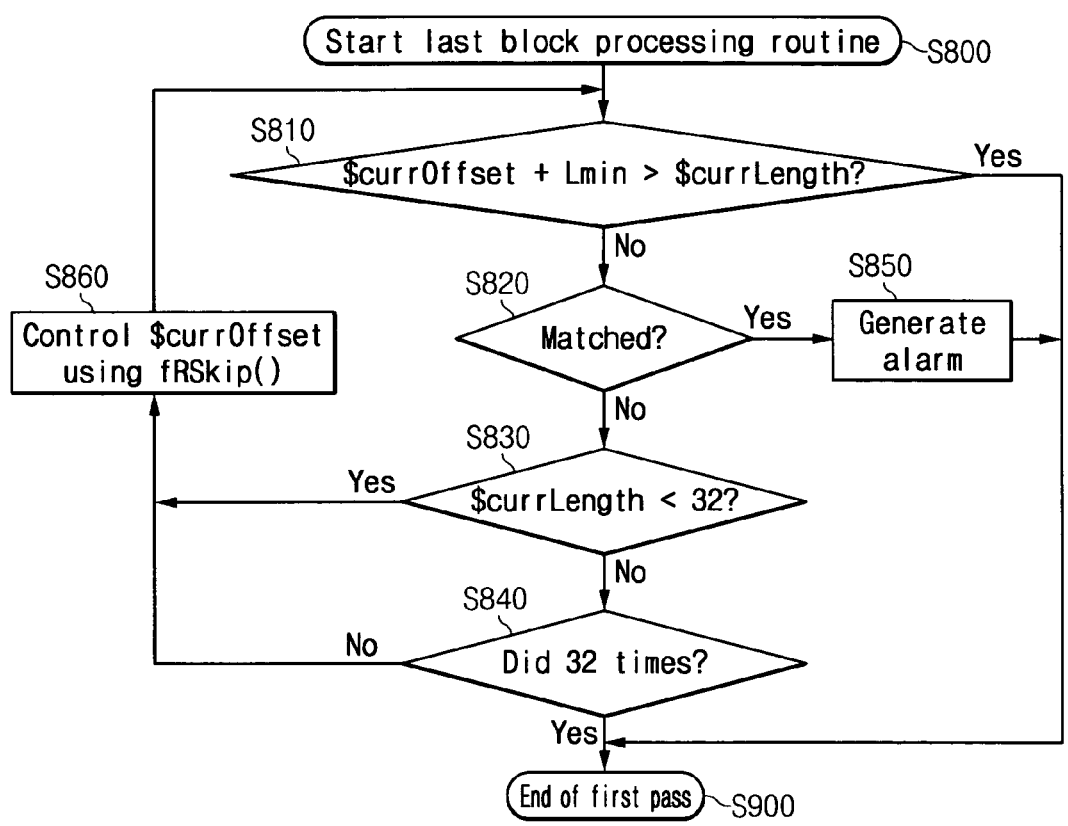
FIG. 12 shows a flowchart of a last block processing stage shown in FIG. 7.

FIG. 12 shows a flowchart of a last block processing stage shown in FIG. 7.

As shown, the third pass 232a checks in step S810 whether it is satisfied that $currOffset+Lmin>63, terminates the attack state detecting process in step S900 when the checking result is satisfied, and performs pattern matching in step S820 according to the Snort rule (the attack signature) received from the personal computer 240 when the checking result is not satisfied. The attack signature received from the personal computer 240 is varied by a manager or according to attack patterns that vary in real-time.

The third pass 232a generates an alarm to the personal computer 240 in step S850 when a pattern matched with the attack signature is generated according to the pattern matching result, and checks whether it is satisfied that $currLength<32 in step S830 when no matching pattern is generated, where $currLength is the total length of the current block and has values of from 0 to 63.

The third pass 232a checks whether the number of executed pattern matching processes on the current block is 32 in step S840 when the condition of $currLength<32 is not satisfied, and terminates the attack state detecting process in step S900 when the condition is satisfied.

The third pass 232a uses fRSkip( ) to control $currOffset in step S860 when the condition is not satisfied, and checks whether the condition of $currOffset+Lmin>63 is satisfied in step S810.

As described, the in-line mode network intrusion detect/prevent system comprises a first network processor unit for monitoring packets transmitted and received through the network to collect various statistical data, filtering the packets according to a preventing rule, and performing a sensing process; and a second network processor unit for checking a payload of the packets based on the known attack signature to detect network intrusion states and attacks, and preventing the intrusion and attacks.

That is, the present invention quickly processes the network intrusion and stably processes gigabit-leveled huge traffic by checking the network intrusion and preventing the corresponding attacks in real-time through a usage of gigabit Ethernet ports.

Also, the present invention allows updating of various references, such as a traffic mirroring rule, a filtering rule, and a sensing rule, needed for detecting and preventing the attack states through a manager (a personal computer), and generates ease of usage and economic merits.

Further, the present invention separately manages a process for forwarding packet data and a process for retrieving a payload of the packet data, thereby enhancing the stability of the in-line mode system.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a system coupled between a protection network and an external network, for detecting intrusion states between the protection and external networks and preventing the intrusion, an in-line mode network intrusion detecting and preventing system comprising:
   a first network processor unit for monitoring an externally received PDU (packet data unit), collecting various statistical data according to a metering rule, selectively discarding or passing the received PDU according to a packet preventing rule, and generating a duplicate of the PDU according to a sensing rule;
   a second network processor unit for performing pattern matching on the payloads using at least one attack signature received from a personal computer; and
   the personal computer for generating or updating a packet preventing rule for preventing the intrusion detected by the second network processor unit, and providing the packet preventing rule to the first network processor unit;
   a line interface including:
       a first gigabit Ethernet port coupled to a gigabit PHY (physical layer) device; and
       a second gigabit Ethernet port coupled to the gigabit PHY device,
   wherein the gigabit PHY device is coupled to the first network processor.

2. The system of claim 1, wherein the line interface operates to transmit at least one PDU received from an external Ethernet interface to the first network processor unit.

3. The system of claim 2, wherein the personal computer generates or updates a packet preventing rule and a sensing rule which include at least one of a transmitter port address and a destination port address of the PDU, a transmitter IP (Internet protocol) address, a destination IP address, a protocol, and a TCP (transmission control protocol) flag bit or which include a combination of at least two of them.

4. The system of claim 3, wherein the personal computer generates or updates a metering rule which includes at least one of a transmitter Ethernet address, a destination Ethernet address, and an Ethernet type of the PDU, a transmitter IP address, a destination IP address, a transmitter port address, a destination port address, a protocol, and a TCP flag bit or which includes combinations of at least two of them.

5. The system of claim 4, wherein the first network processor unit comprises:
   a sorter for determining whether to discard or pass the PDU received from the line interface according to the packet preventing rule received from the personal computer, and determining whether to duplicate the received PDU according to the sensing rule received from the personal computer;
   a traffic manager for discarding the received PDU or duplicating the PDU determined to be sensed thereby generating a duplicate of the PDU, according to a discarding determination by the sorter; and
   a state engine for managing various statistical data relating to the PDU received from the line interface, according to the traffic metering rule received from the personal computer.

6. The system of claim 5, wherein the first network processor unit further comprises:
- first to fourth logic ports for outputting the PDU to the Ethernet interface, or receiving the PDU from the Ethernet interface;
- a link layer receiver for receiving the duplicate of the PDU from the state engine;
- a PDU converter/duplicator for generating a BPDU (bearer PDU) and an SPDU (shortened PDU) by using the received duplicate of the PDU; and
- a PHY transmitter for transmitting the generated BPDU and the SPDU to the second network processor unit.

7. The system of claim 6, wherein the second network processor unit comprises:
- a sorter for performing pattern matching on the payloads of the transmitted BPDU and the SPDU according to the rule received from the personal computer, and detecting the intrusion state between the protection and external networks;
- a state engine for collecting and managing information on the detected intrusion state; and a PCI interface for transmitting the collected and managed information to the personal computer.

8. In a method for detecting intrusion states between a protection network and an external network, and preventing the intrusion, an in-line mode network intrusion detecting and preventing method comprising:
- (a) generating a packet preventing rule which is a reference for discarding at least one externally received PDU (packet data unit) or passing the same;
- (b) selectively discarding or passing the received PDU according to the generated packet preventing rule;
- (c) applying at least one attack signature to a payload of the passed PDU, and detecting the intrusion state between the protection and external networks; and
- (d) generating or updating a rule for preventing the detected attack, and preventing the detected attack, wherein externally received PDUs are sorted through pattern matching based on metering, filtering, and sensing rules received from a personal computer.

9. The method of claim 8, wherein (a) comprises:
- generating or updating a packet preventing rule which includes at least one of a transmitter port address and a destination port address of the received PDU, a transmitter IP (Internet protocol) address, a destination IP address, a protocol, and a TCP (transmission control protocol) flag bit or which includes combinations of at least two of them;
- generating or updating a sensing rule which includes at least one of a transmitter port address and a destination port address of the received PDU, a transmitter IP (Internet protocol) address, a destination IP address, a protocol, and a TCP (transmission control protocol) flag bit or which includes combinations of at least two of them; and
- generating or updating a metering rule which includes at least one of a transmitter Ethernet address, a destination Ethernet address, and an Ethernet type of the received PDU, a transmitter IP address, a destination IP address, a transmitter port address, a destination port address, a protocol, and a TCP flag bit or which includes combinations of at least two of them.

10. The method of claim 9, wherein (b) comprises:
- determining whether to discard or pass the externally received PDU according to the generated or updated packet preventing rule; discarding the received PDU when it is determined to discard at least one PDU from among the received PDUs;
- duplicating the PDU to be passed and generating a duplicate of the PDU when it is determined to pass at least one PDU from among the received PDUs; and
- adding an ID to the duplicate of the PDU, and outputting the ID-added duplicate of the PDU, the ID being addition information.

11. The method of claim 10, wherein (b) further comprises:
- generating a BPDU (bearer PDU) by using the duplicate of the PDU; and
- generating an SPDU (shortened PDU) having a size less than that of the generated BPDU, and outputting the SPDU and the BPDU.

12. The method of claim 11, wherein (c) further comprises:
- performing pattern matching to compare payloads of the BPDU and the SPDU with the attack signature provided by a manager for managing the protection or external network; and
- detecting the attack states to the protection or external network according to a performed pattern matching result, transmitting the detection result to the manager, and updating or generating the attack signature provided by the manager.

* * * * *